United States Patent

[11] 3,628,257

| [72] | Inventor | Charles R. Budrose<br>Melrose, Mass. |
|---|---|---|
| [21] | Appl. No. | 26,949 |
| [22] | Filed | Apr. 9, 1970 |
| [45] | Patented | Dec. 21, 1971 |
| [73] | Assignee | Bio-Dynamics, Inc.<br>Cambridge, Mass. |

[54] BRAILLE DICTIONARY
10 Claims, 4 Drawing Figs.

[52] U.S. Cl. .................................................. 35/35 A,
179/100.2 S
[51] Int. Cl. ......................................................... G09b 5/04
[50] Field of Search ........................................... 35/35 A, 35
C, 8 A; 179/100.2 S, 100.2 Z

[56] References Cited
UNITED STATES PATENTS

| 2,549,632 | 4/1951 | Nottingham.................. | 35/35 A |
| 2,965,720 | 12/1960 | Bumstead..................... | 179/100.2 S |
| 3,020,360 | 2/1962 | Gratian et al................. | 35/35 C X |
| 3,289,327 | 12/1966 | Chevillon..................... | 35/35 A |
| 3,334,194 | 8/1967 | Chang.......................... | 179/100.2 S |
| 3,344,239 | 9/1967 | Ragland ....................... | 340/149 X |

Primary Examiner—Wm. H. Grieb
Attorney—Morse, Altman & Oates

ABSTRACT: An electromechanical apparatus adapted for interconnection with a cassette communicative mechanism in place of the cassette is provided for audio presentation of selected braille symbol definitions. The apparatus includes a length of magnetic tape having representations of audio reproducible braille symbol definitions, a switch matrix in a braille cell configuration, a brake for stopping the magnetic tape at a desired location and a memory logic circuit for receiving input signals from the switch matrix and selectively controlling the brake. Initially, the magnetic tape is advanced rapidly in search for the braille symbol representation entered into the memory from the switch matrix. Once the braille symbol representation is located, a signal generated by the memory logic circuit actuates the brake. Thereafter, the mechanism is placed in the PLAY position and the definition of the selected braille symbol is presented as an audio signal for aural perception.

INVENTOR
CHARLES R. BUDROSE
BY
Morse, Altman & Oates
ATTORNEYS

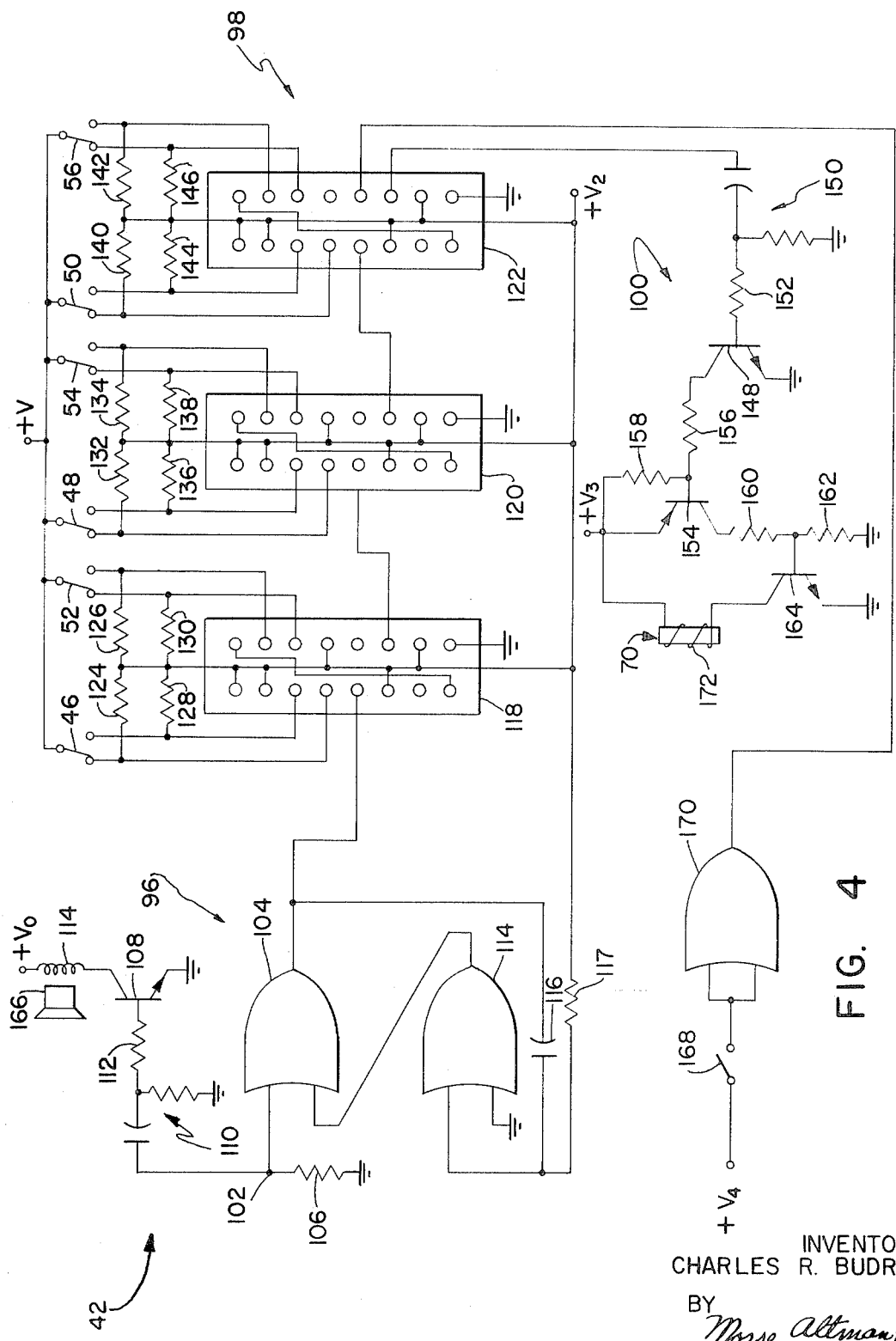

BRAILLE DICTIONARY

BACKGROUND OF THE INVENTION

1. Field of Invention

The present invention relates to cassette communicative devices and, more particularly, to such devices which are adapted for audio presentation of braille symbol definitions.

2. Description of the Prior Art

In the braille system of writing, each letter of the alphabet is designated by a specific arrangement of raised dots in a braille cell configuration. The first 10 letters also serve as numerals. The position of a braille letter in a sentence structure defines the meaning of the letter. In other words, a braille letter is actually a symbol and braille writing is akin to shorthand. Systems which provide the several meanings associated with each braille symbol are inadequate.

SUMMARY OF THE INVENTION

The invention described herein was made in the course or under contract with the Department of Health, Education and Welfare; office of Education.

An object of the present invention is to provide an electromechanical apparatus adapted for interconnection with a cassette communicative mechanism in place of the cassette for audio presentation of selected braille symbols. The apparatus is characterized by a length of magnetic tape having representations of audio reproducable braille symbol definitions, a switch matrix in a braille cell configuration, a memory logic circuit for locating specific braille symbol representations on the magnetic tape and a brake control for stopping the magnetic tape at a desired position. The magnetic tape is mounted on spools which are driven by the mechanism. A braille symbol, the definition of which is desired, is placed into the memory by energizing selectively the switches in the matrix. The magnetic tape is advanced rapidly until the braille symbol representation on the magnetic tape which corresponds to the braille symbol entered into the memory from the switch matrix is located. Once the braille symbol representation position is sensed, the brake control is activated and advancement of the magnetic tape is halted. Thereafter, the mechanism is placed in the PLAY position and the braille symbol definition is presented as an audio signal for aural perception. The combination of magnetic tape, switch matrix, brake control and memory logic circuit is such as to provide a compact and inexpensive device for audio presentation of braille symbol definitions.

The invention accordingly comprises the apparatus possessing the construction, combination of elements, and arrangement of parts that are exemplified in the following detailed disclosure, the scope of which will be indicated in the appended claims.

BRIEF DESCRIPTION OF DRAWINGS

For a fuller understanding of the nature and objects of the present invention, reference should be had to the following detailed description taken in connection with the accompanying drawings wherein:

FIG. 4 is a schematic diagram of the memory logic circuit of Fig. 1.

DETAILED DESCRIPTION OF THE PREFERRED EMBODIMENT

Figure 1:
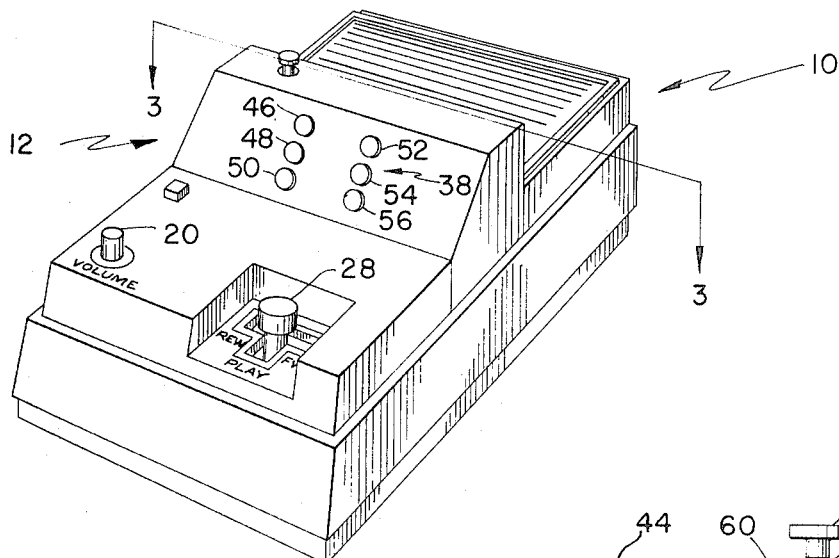
FIG. 1 is a perspective of an audio communicative instrument embodying the present invention.

Generally, the audio communicative instrument of Fig. 1 comprises a mechanism 10 and an electromechanical apparatus 12. In the preferred embodiment, mechanism 10 is a cassette tape recorder adapted for interconnection with a magnetic tape cartridge and apparatus 12 is removably seated in tape recorder 10 in place of the cartridge.

Figure 2:
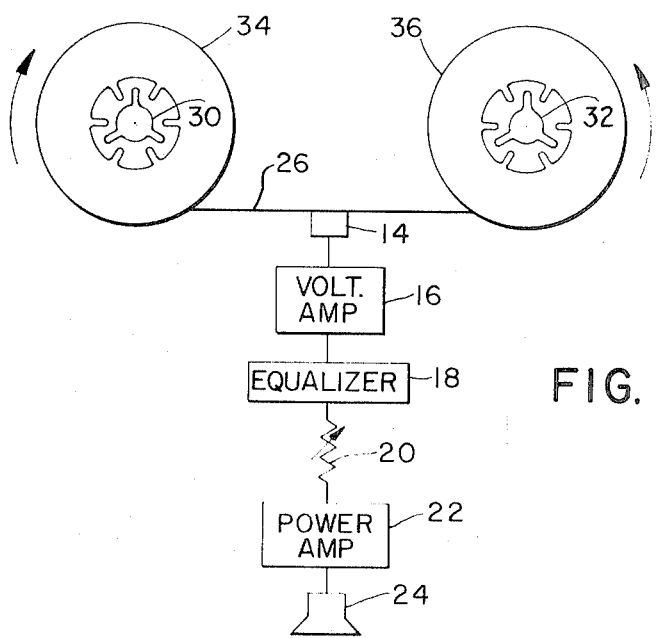
FIG. 2 is a block diagram, somewhat pictorial, of the audio reproducing circuitry of the mechanism of FIG. 1.

As illustrated in Fig. 2, the audio reproducing portion of tape recorder 10 includes a sensor 14, a voltage amplifier 16, an equalizer 18, a volume control 20, a power amplifier 22 and a speaker 24. A magnetic tape 26 is driven in a forward and reverse direction across sensor 14 in response to movement of a control 28 which is operatively connected to drive capstans 30 and 32. Magnetic tape 26 is threaded on spools 34 and 36 which are driven by capstans 30 and 32, respectively. The toothed outer periphery of each drive capstan 30 and 32 gearingly engages the interior castellated surface of spools 34 and 36, respectively. In the illustrated embodiment, mechanism 10 includes drive capstans 30 and 32 and apparatus 12 includes spools 34 and 36. When control 28 is moved to the PLAY position, magnetic tape 26 travels past sensor 14, in consequence a magnetic field corresponding to the pattern of the magnetic tape is produced. A voltage is developed in the coil (not shown) of sensor 14 as a result of the variations in magnetic flux through the coil. The signals as at the output of sensor 14 are amplified in voltage amplifier 16 and are applied to equalizer 18. The signals as at the output of equalizer 18 are applied to power amplifier 22 through volume control 20. The signals as at the output of power amplifier 22 are applied to speaker 24 for aural presentation.

Figure 3:
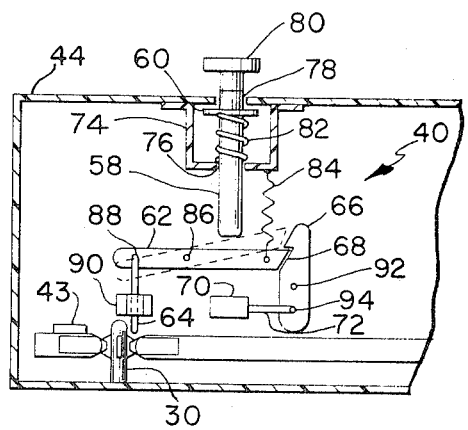
FIG. 3 is a section along the lines 3—3 of FIG. 1.

Apparatus 12 comprises a switch matrix 38, a brake control 40, a memory logic circuit 42 and a position sensor 43 mounted in an enclosure 44. Switch matrix 38 includes a plurality of switches 46, 48, 50, 52, 54 and 56 in a braille cell configuration, i.e., two columns of three rows each. The details of brake control 40 and memory logic 42 are shown in Figs. 3 and 4, respectively.

In general, brake control 40 includes a cylindrical shaft 58, having an annular flange 60, a leg or lever 62 having an extension 64 at one end, an arm 66 formed with a notch 68 and solenoid 70 having a plunger 72. A bracket 74 formed with a circular opening 76 is affixed to enclosure 44 at the interior upper surface thereof. Enclosure 44 is formed with a circular opening 78 in register with circular opening 76. Shaft 58 is slidably received within openings 76 and 78, a guideway for shaft 58 being formed by the openings. A cap 80 is fastened to the upper end of shaft 58 which extends through opening 78. A spring 82 spiraled about shaft 58 is held in position by bracket 74 and annular flange 60, the diameter of spring 82 being slightly larger and smaller than opening 76 and flange 60, respectively. Flange 60 is pushed against the interior upper surface of enclosure 44 by the action of spring 82. One end of a spring 84 is affixed to the end of lever 62 opposite extension 64. When the end of lever 62 is disengaged from notch 68, lever 62 bears against the lower end of shaft 58 by the action of spring 84, lever 62 being pivoted about a pin 86. Extension 64 is pivotably mounted to lever 62 via a pin 88 and slidably received by a bracket 90. When lever 62 is disengaged from notch 68, extension 64 engages a tooth on the outer periphery of drive capstan 30. Arm 66 is pivotably mounted to enclosure 44 via a pin 92 and plunger 72 is pivotably coupled to arm 66 via a pin 94. When solenoid 70 is actuated, plunger 72 is pulled toward solenoid 70, in consequence lever 62 is disengaged from notch 68.

Generally, memory logic circuit 42, shown in Fig. 4, comprises an input circuit 96, a memory 98 and a drive circuit 100. The signal as at the output of sensor 43 is applied to a summing junction 102 as at the first input of an OR-gate 104. Summing junction 102 is connected to ground through a resistor 106 and to the base of a transistor 108 through a differentiating circuit 110 and a resistor 112. The collector of transistor 108 is connected to a positive voltage $V_1$ through a coil 114 and its emitter is connected directly to ground. The second input of OR-gate 104 is connected directly to the output of an OR-gate 114 and the first input of OR-gate 114 is connected to the output of OR-gate 104 through a capacitor 116. In addition, the first input of OR-gate 114 is connected also to a positive voltage $V_2$ through a resistor 117. The second input of OR-gate 114 is grounded. The signal as at the output of OR-gate 104 inputs memory 98.

Memory 98 includes registers 118, 120 and 122 connected in a six bit binary code configuration, each register representing two bits. Switches 46, 52; 48, 54; and 50, 56 are connected to registers 118; 120; and 122, respectively, each switch representing one bit of the six bit binary code. In the illustrated embodiment, switch 46 is the least significant bit and switch 56 is the most significant bit. Preferably, each of switches 46, 48, 50, 52, 54 and 56 is of the single throw double pole variety. The normally closed pole of switch 46 is connected to the normally opened pole of switch 52 through resistors 124, 126 and the normally opened pole of switch 46 is connected to the normally closed pole of switch 52 through resistors 128, 130. Switches 48, 54 and 50, 56 reconnected to resistors 120 and 122, respectively, in a similar manner. Switch 48 is connected to switch 54 via resistor 132, 134, 136 and 138 and switch 50 is connected to switch 56 via resistors 140, 142, 144 and 146, resistors 132, 140; 134, 142; 136, 144; and 138, 146 corresponding to resistors 124; 126; 128 and 130, respectively. Voltage $V_2$ is applied to the junction of resistors 124, 126, 128 and 130, the junction of resistors 132, 134, 136 and 138, and the junction of resistors 140, 142, 144 and 146. Register 112 communicates with drive circuit 100.

The most significant bit signal as at the output of register 122 is applied to the base of a transistor 148 through a differentiating circuit 150 and a resistor 152. The emitter and collector of transistor 148 are connected to ground and to the base of transistor 154 via a resistor 156, respectively. The junction of the base of transistor 154 and resistor 156 is connected to a voltage $V_3$ through a resistor 158. The emitter of transistor 154 is connected directly to voltage $V_3$. The collector of transistor 154 is connected to ground through resistors 160 and 162. The junction of resistors 160 and 162 is connected directly to the base of transistor 164. The emitter of transistor 164 is grounded. One side of solenoid 70 is connected to the collector of transistor and the other side is connected to voltage $V_3$.

For a fuller understanding of the functional interrelationship between tape recorder 10 and apparatus 12 (input circuit 96, memory 98 and drive circuit 100) reference is made to the following illustrative example of the operation of the audio communicative instrument.

Initially, control 28 is placed in the REWIND position, in consequence drive capstan 30 rotates clockwise and magnetic tape 26 is wound on spool 34. One end of magnetic tape 26 is affixed to spool 34 and the other end is affixed to spool 36, so that the magnetic tape remains threaded in tape recorder 10. Magnetic tape 26 is provided with a counting medium (not shown) for each symbol, for example an aluminum sensing tape affixed thereto, in consequence a pulsed or digital signal is generated by sensor 43 as magnetic tape 26 passes thereby. Each pulse of the signal as at the output of sensor 43 is applied as a positive spike to the base of transistor 108 through differentiating circuit 110. A positive spike as at the base of transistor causes transistor to conduct, in consequence current flows through coil 114 and an audible beep tone is produced by a speaker 166. When magnetic tape 26 is wound on spool 34, the beep tone ceases and control 28 is returned to the NEUTRAL position. A momentary switch 168 is depressed and a voltage $V_4$ is applied to register 122 via an OR-gate 170, in consequence registers 118, 120 and 122 are reset to zero.

Thereafter, the switches in matrix 38 are selectively energized in a braille symbol format. That is, if the desired braille symbol definition desired is "A," only switch 46 is energized, if the desired braille symbol definition is "M," switches 46, 50 and 52 are energized and so on. As previously stated, each switch in matrix 38 represents one bit of a six bit binary code. Accordingly, when the switches in matrix 38 are energized, the corresponding binary code number is entered into memory 98. Control 28 is placed in the FORWARD position and magnetic tape 26 is wound on spool 36. As in the rewind phase, an audio beep tone is presented by speaker 166 as the counting medium passes by sensor 43. In addition, the signal as at the output of sensor 43 is applied to register 118 via OR-gate 104, in consequence the binary number entered into memory 98 is increased by one for every pulse as at the output of sensor 43. When the number entered into memory 98 increases from 63 to 64, i.e., the binary code changes from 111111 to 000000, a positive pulse is generated by register 122.

The pulse as at the output of register 122 is applied to the base of transistor 148 in consequence transistor 148 conducts. As a result of the conduction of transistor 148, the voltage as at the base of transistor 154 decreases, whereby transistor 154 conducts, the voltage as at the base of transistor 164 increases, in consequence transistor 164 conducts. As a result of the conduction of transistor 164, current flows through a coil 172, whereby solenoid 70 is energized. Plunger 72 is retracted into solenoid 70, in consequence lever 62 is disengaged from notch 68 and extension 64 engages drive capstan 30 and advancement of magnetic tape 26 is halted.

Thereafter, arm 66 returns to its normal position, solenoid 70 being energized momentarily in response to the pulse as at the output of register 122. However, due to the action of spring 84, extension 64 and drive capstan 30 remain engaged. Control 28 is returned to the NORMAL position. Cap 80 is depressed and shaft 58 causes lever 62 to be pivoted about pin 86, in consequence lever 62 is engaged by notch 68 and extension 64 is disengaged from drive capstan 30.

Control 28 is placed in the PLAY position and the definition of the braille symbol entered into memory 98 is presented for aural perception. The sequence is repeated for each braille symbol definition desired.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A communicative instrument comprising:
   a. an audio reproducing mechanism adapted for interconnection with a cassette;
   b. an enclosure removably seated within said mechanism in place of the cassette;
   c. a web stored in said enclosure and threaded in said mechanism, said web having audio reproducable braille symbol definitions and a digital counting medium;
   d. a switch matrix affixed to said enclosure for selectively providing a plurality of digital signals, said switch matrix being in a braille cell configuration, each of said plurality of digital signals representing a selected braille symbol;
   e. counting means electrically communicating with said switch matrix and operatively connected to said web for receiving digital signals from said web and switch matrix, the digital signals as at the output of said switch matrix representing a specific count, the count being advanced by each digital signal from said web, said counting means generating an output signal when the count reaches a specific number; and
   f. means drivingly connected to said web for controlling movement of said web, said control means being disabled by said counting means output signal;
   g. whereby the definition of the braille symbol entered into said counting means from said switch matrix is presented for aural perception by said audio reproducing mechanism.

2. The communicative instrument as claimed in claim 1 wherein said audio reproducing mechanism is a tape recorder.

3. The communicative instrument as claimed in claim 1 wherein said web is a magnetic tape.

4. The communicative instrument as claimed in claim 1 wherein said counting means includes a plurality of interconnected registers.

5. The communicative instrument as claimed in claim 1 including brake means electrically communicating with said counting means.

6. The communicative instrument as claimed in claim 5 wherein said brake means includes:
a. a shaft slidably received within said enclosure;
b. a leg pivotably mounted within said enclosure, said leg having an extending member, said leg being engaged by said shaft;
c. an arm formed with a notch pivotably mounted to said enclosure, said arm being adapted for engagement and disengagement with said leg;
d. means operatively connected to said arm for pivoting said arm in and out of engagement with said leg, said control means being disabled when said leg is disengaged, said leg being pivoted into engagement with said arm by said shaft.

7. The communicative instruments as claimed in claim 1 wherein said digital counting medium is an aluminum sensing tape.

8. A communicative instrument comprising:
a. an audio reproducing mechanism adapted for interconnection with a cassette;
b. an enclosure removably seated within said mechanism in place of the cassette;
c. a web stored in said enclosure and threaded in said mechanism, said web having audio reproducable braille symbol definitions and a digital counting medium;
d. a switch matrix affixed to said enclosure for selectively providing a plurality of digital signals, each of said plurality of digital signals representing a selected braille symbol;
e. counting means electrically communicating with said switch matrix and operatively connected to said web for receiving digital signals from said web and switch matrix, the digital signals as at the output of said switch matrix representing a specific count, the count being advanced by each digital signal from said web, said counting means generating an output signal when the count reaches a specific number;
f. control means drivingly connected to said web for controlling movement of said web;
g. brake means electrically communicating with said counting means and operatively connected to said control means, said brake means being responsive to signals as at the output of said counting means, said control means being disabled by said brake means; and
h. means operatively connected to said audio reproducing mechanism for control thereof, the definition of the braille symbol entered into said counting means being presented aurally.

9. The communicative instrument as claimed in claim 8 wherein said audio reproducing mechanism is a cassette tape recorder and said web is a magnetic tape.

10. The communicative instrument as claimed in claim 8 wherein said brake means includes:
a. a shaft slidably received within said enclosure;
b. a leg having an extending member adapted for engagement with said control means, said leg being engaged by said shaft;
c. an arm pivotably mounted to said enclosure, said arm formed with a notch adapted for engagement and disengagement with said leg;
d. means operatively connected to said arm for pivoting said arm in and out of engagement with said leg, said control means being disabled when said leg is disengaged, said leg being pivoted into engagement with said arm by said shaft.

\* \* \* \* \*